United States Patent

Schmid et al.

Patent Number: 6,119,300
Date of Patent: *Sep. 19, 2000

[54] WIPER BLADE FOR A VEHICLE WINDSCREEN WIPER DEVICE

[75] Inventors: Eckhardt Schmid, Brackenheim; Jurgen Bommer, Tamm; Klaus Fischer, Bietigheim-Bissingen; Bruno Egner-Walter, Heilbronn, all of Germany

[73] Assignee: ITT Manufacturing Enterprises Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 09/155,339

[22] PCT Filed: Feb. 25, 1997

[86] PCT No.: PCT/EP97/00883

§ 371 Date: May 24, 1999

§ 102(e) Date: May 24, 1999

[87] PCT Pub. No.: WO97/35751

PCT Pub. Date: Oct. 2, 1997

[30] Foreign Application Priority Data

Mar. 27, 1996 [DE] Germany ............................ 196 12 133

[51] Int. Cl.[7] ................................. B60S 1/38; B60S 1/46; B60S 1/28

[52] U.S. Cl. .................................. 15/250.04; 15/250.41; 15/250.4

[58] Field of Search ........................... 15/250.04, 250.41, 15/250.4, 250.48, 250.451, 250.361

[56] References Cited

U.S. PATENT DOCUMENTS

| | | | |
|---|---|---|---|
| 1,379,463 | 3/1921 | Keine . | |
| 1,864,208 | 6/1932 | Lundberg | 15/250.41 |
| 2,179,454 | 11/1939 | Paulus | 15/250.4 |
| 5,048,146 | 9/1991 | Cavenago | 15/250.4 |

FOREIGN PATENT DOCUMENTS

| | | |
|---|---|---|
| 0228313 | 7/1987 | European Pat. Off. . |
| 2003912 | 8/1971 | Germany . |
| 2133270 | 1/1973 | Germany . |
| 7239051 | 6/1973 | Germany . |
| 7312021 | 8/1973 | Germany . |
| 7330615 | 12/1974 | Germany . |
| 7434935 | 5/1975 | Germany . |
| 8312248 | 7/1985 | Germany . |
| 3912051 | 10/1990 | Germany . |
| 4141603 | 9/1993 | Germany . |
| 1316781 | 5/1973 | United Kingdom ................ 15/250.41 |
| WO8302756 | 8/1983 | WIPO . |

Primary Examiner—Gary K. Graham
Attorney, Agent, or Firm—J. Gordon Lewis

[57] ABSTRACT

A windshield wiper blade for a vehicle windshield wiper device features a wiper blade rubber made of a resiliently deformable material which exhibits a backing to which two parallel wiper lips are connected by means of a flexible neck and an intensive-cleaning element attached to each of the mutually remote longitudinal sides of the wiper lips, wherein the intensive-cleaning element leading relative to the direction of motion of the wiper blade rubber and the wiping edge of the trailing wiper lip contacts the windshield. In order to improve the wiping quality of the wiper blade rubber, both wiper lips exhibit an essentially triangular cross-section of standard wiper blade rubbers and are connected to the backing in such a way that, when the wiper is operating, each can be supported on the bottom side of the backing with a shoulder lying at the rear in relation to the direction of motion. In another variant designed to improve the wiping quality of the wiper blade rubber, the intensive-cleaning elements are formed by numerous individual segments mutually spaced along the length of the wiper blade rubber, with the segments of one intensive-cleaning element offset in the longitudinal direction relative to the segments of the other intensive-cleaning element.

11 Claims, 1 Drawing Sheet

WIPER BLADE FOR A VEHICLE WINDSCREEN WIPER DEVICE

BACKGROUND OF THE INVENTION

This invention relates to a windshield wiper blade for a vehicle windshield wiper devise.

German patent application no. DE 27 00 527 A1 discloses a windshield wiper blade consisting of a wiper blade rubber made of resiliently deformable material that has two parallel wiper lips, each of which is connected to a backing by means of a neck. An element for removing insects and dirt is attached to each of the mutually remote longitudinal sides of the wiper lips, with such insect and dirt removing element being made up of a strip of sponge, brushes, squeegee/scrubber, or other suitable elements or parts. The cross-section shows that these wiper lips are relatively narrow in relation to their height and separated by only a small gap. The necks which connect the wiper lips to the backing are in alignment with the longitudinal sides of the wiper lips that face each other. Even though each wiper lip thus exhibits only one shoulder formed between the mutually remote longitudinal sides and the upper sides of the wiper lip, it is not evident that such shoulder can be supported by the backing at any time during the wiping operation. Since, in addition, the wiper lips are relatively high and narrow, it can be assumed that the wiper lips are very flexible and, consequently, that their lower parts are deformed relatively strongly in the direction of the surface of the windshield during wiping operations. Therefore, on the one hand, a relatively large part of the insect or dirt removing element contacts the windshield to be cleaned, which means it does so with relatively low surface pressure and, hence, the intensity of the cleaning operation is reduced. On the other hand, it can be expected that the wiper lips cannot change to the opposite titled position when the direction of motion is reversed in accordance with their proper function. If the wiper lips do not swing to the other tilted position properly at the reversal point, the insect and dirt removing element which is in contact with the windshield will create a film of direct that impedes visibility and cannot be removed immediately by the wiping edge of the trailing wiper lip. In both cases, the desired good wiping quality is not achieved. If the swinging-over of the wiper lips to the opposite tilted position is to be ensured by additional technical measures, for example, by reducing the contact pressure of the windshield wiper blade at the reversal point, additional technical efforts and expenses would be required.

SUMMARY OF THE INVENTION

The object of the present invention is to improve the wiping quality of a windshield wiper blade of the type described above through simple technical means.

According to the present invention, in such a windshield wiper blade, the two wiper lips of the wiper blade rubber are not as highly flexible as those disclosed in German patent application no. DE 27 00 527 A1. Thus, the intensive-cleaning element can be pressed against the windshield with greater surface pressure, which increases the cleaning effect when there is a lot of direct or very sticky dirt on the windshield. Due to the symmetrical form of each wiper lip and since each shoulder of each wiper lip can be supported on the underside of the backing on both sides, it is ensured that the wiper lips swing to the other titled position properly when the direction of motion of the wiper blade rubber is reversed. Hence, the dirt loosened or cleaned from the windshield by the leading intensive-cleaning element is definitely removed by the wiping edge of the trailing wiper lip in both directions of motion of the wiper blade rubber.

A further embodiment of the invention offers the additional advantage that the individual segments of the intensive-cleaning elements sweep over the windshield with even greater surface pressure and, thus, can loosen or wipe off even more tenacious dirt. Consequently, the entire area wiped by the windshield wiper blade is swept over once completely by intensive-cleaning elements during one complete wiping cycle, which consists of a to-and-fro motion of the windshield wiper blade. When the spacing between the individual segments of the intensive-cleaning elements corresponds exactly to the longitudinal extension of the segments, the surface pressure applied by the intensive-cleaning elements can be doubled.

The object of the invention also is achieved through a windshield wiper blade embodiment based on the assumption that, in the conventional wiper blade rubber described above, the wiper lips will definitely swing over to the opposite tilted position when the direction of motion of the wiper blade rubber is changed, which is necessary for it to function properly. Therefore, in this case, a marked improvement in the wiping quality is achieved simply by dividing the intensive-cleaning elements into individual segments and arranging them lengthwise on the wiper blade rubber, i.e. on the mutually remote longitudinal sides of the wiper lips in offset positions relative to one another. By increasing the surface pressure with which the intensive-cleaning elements, which now consist of segments, sweep the windshield, their cleaning effect is markedly intensified.

Another embodiment helps to improve the wiping quality of the windshield wiper blade in that, contrary to arranging washer fluid nozzles at some other place on the vehicle body, washer fluid can be applied to the area of the windshield that is to be cleaned considerably better and more evenly prior to the actual wiping operation. In this connection an embodiment makes it possible to precisely apply washer fluid only to the area of the windshield lying in front of the wiper blade rubber relative to the direction of motion. This offers the advantage that the visibility in the area behind the moving windshield wiper blade is not impeded by washer fluid being applied to the windshield. In addition, the amount of washer fluid used is reduced. It should be noted at this point that the washer-fluid conduit and its fluid openings also can be used to apply a concentrated intensive-cleaning agent in case of extremely tenacious debris or a defrosting agent in winter precisely and evenly onto the windshield.

In another embodiment, washer fluid can additionally be discharged into the space between the two wiper lips while the windshield is being cleaned. In this way, washer fluid can once again be applied to the dirt that was loosened by not yet removed from the windshield by the intensive-cleaning element, and, hence, such dirt can be removed more easily from the wiped area on the windshield by the wiping edge of the trailing wiper lip. A wiper blade rubber according to the present invention can be manufactured at low cost when its main part is produced by extrusion and consists of a backing and two wiper lips connected to the backing, whereby the intensive-cleaning elements are attached to the outer longitudinal sides of the wiper lips after the main part has been produced.

In order to achieve the desired even or targeted uneven distribution of the contact pressure applied by the wiper blade carrier onto the wiper blade rubber in such a windshield wiper blade, the backing of the wiper blade rubber features one or several channels with a closed cross-section that are located in a longitudinal direction on the wiper blade rubber. A spring strip having the corresponding spring characteristic is mounted in the channel or in each channel respectively.

BRIEF DESCRIPTION OF THE DRAWINGS

An embodiment of the present invention will be described in detail in the accompanying drawings.

DESCRIPTION OF THE PREFERRED EMBODIMENT

Figure 1:
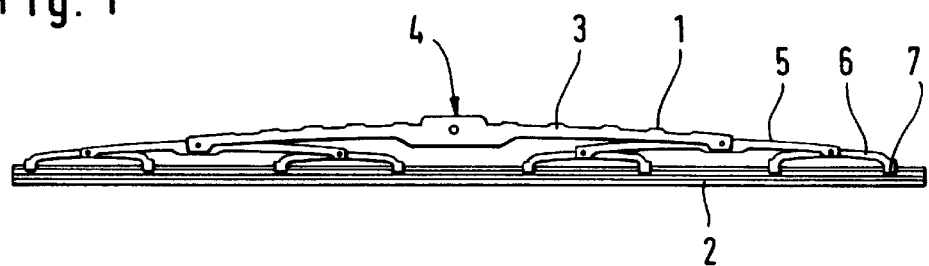
FIG. 1 is a side elevational view of a windshield wiper blade.

The windshield wiper blade disclosed in FIG. 1 exhibits a customarily used wiper blade carrier 1, which holds and guides a wiper blade rubber 2 designed according to the present invention. The wiper blade carrier 1 consists of a main bracket 3 that has a so-called hinge 4 attached to it in the middle for a pivoted connection to a wiper arm that is not shown. Intermediate brackets 5 are articulated to each of the opposite ends of the main bracket 3 respectively like balance arms, and, in turn, claw brackets 6 are articulated to each of the opposite ends of each intermediate bracket 5 like balance arms. The claw brackets 6 are designed in such a way that they can hold and guide the wiper blade rubber 2 with their claw 7. Additional details and characteristic features of the wiper blade rubber are shown in FIGS. 2 and 3.

Figure 2:
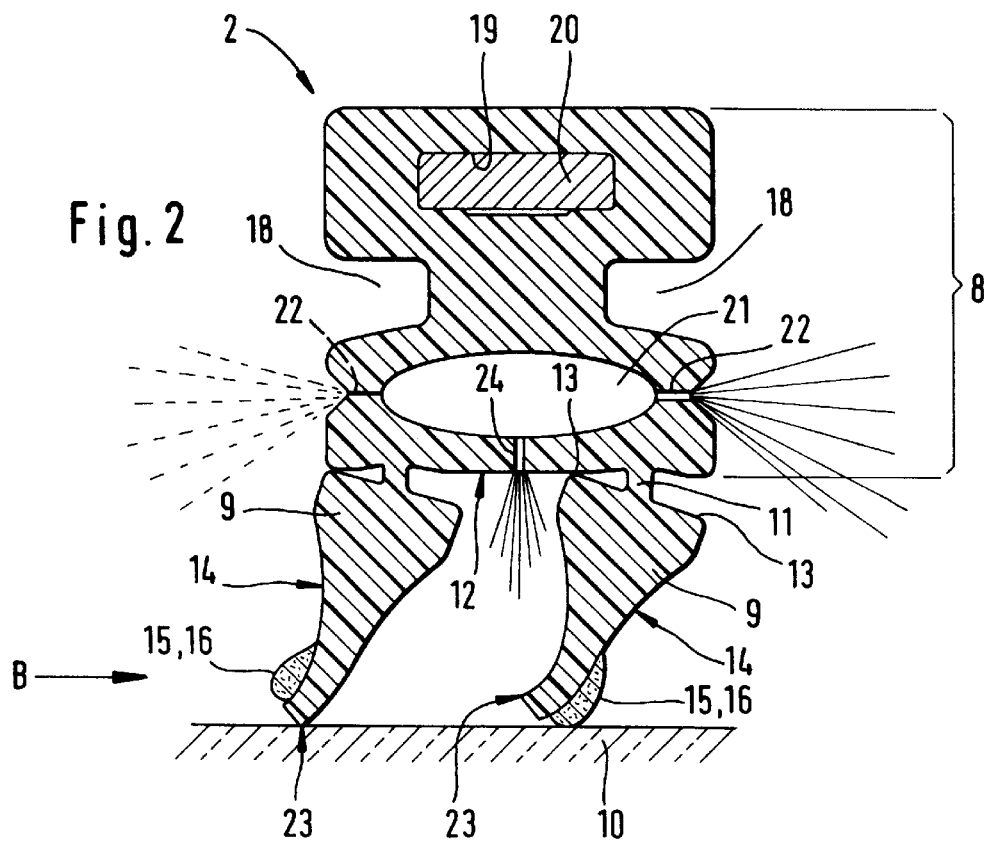
FIG. 2 is an enlarged representation of the cross-section of a wiper blade rubber during a wiping operation.
Figure 3:
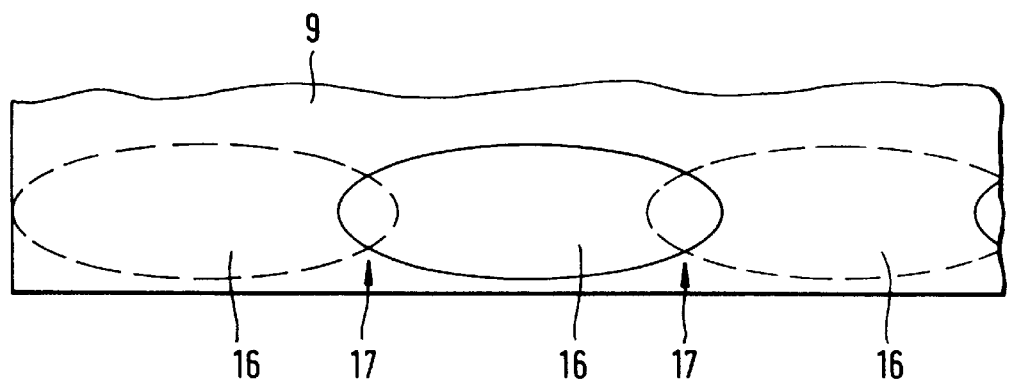
FIG. 3 is an enlarged schematic diagram of a section of the wiper blade from the same view as in FIG. 1.

The wiper blade rubber 2 shown in FIG. 2 is made of elastically deformable material. It essentially consists of a backing 8 and two wiper lips 9 which are formed integrally with the backing 8 in one piece. The two wiper lips 9 are arranged parallel to each other with a certain amount of space in-between which prevents them from mutually affecting each other while carrying out the motions necessary for a proper wiping operation. The wiper lips 9 basically exhibit a triangular cross-sectional form, which is already known from customarily used wiper blade rubbers having only one wiper lip. The narrow side of each wiper lip is turned towards the windshield 10 to be cleaned. Each of the broad upper sides of the wiper lips 9 faces towards the backing 8 and is connected to the underside 12 of the backing 8, i.e., the side facing the windshield 10, by means of elastic flexible necks 11 that are located in the middle of the broad upper sides respectively. Due to the symmetrical cross-sectional form of the wiper lips 9 with respect to an imaginary perpendicular midplane, these have a shoulder 13 on both sides of the flexible neck 11, with which they can support themselves reciprocally on the underside 12 of the backing 8 during wiping operations.

An intensive-cleaning element 15 is attached to each of the mutually remote longitudinal sides 14 of the wiper lips 9, wherein which element is made up of bristles, a sponge or nonwoven fabric, or similar material suitable for intensive cleaning operations. In this connection, the intensive-cleaning elements 15 are made up of individual elongate segments 16, as shown in FIG. 3. These segments 16 are arranged lengthwise along the wiper lip 9 with the distance between each segment being only insignificantly smaller than the linear extension of the individual segments 16. By representing the segments 16 in FIG. 3 with a continuous line and a dotted line, it becomes evident that the segments 16 of the one wiper lip 9, in the longitudinal direction of the wiper blade rubber 2, and the segments 16 of the other wiper lip are offset in such a manner that each of their opposite ends forms a relatively small overlapping area 17.

In addition, FIG. 2 shows that the backing 8 exhibits a longitudinal groove 18 approximately in the middle of each of its mutually remote longitudinal sides. The claws 7 of the claw brackets 6 clamp into these longitudinal grooves 18 in order to hold and guide the wiper blade rubber 2 on the wiper blade carrier 1. A closed channel 19 is centered in the cross-section of the upper area of the backing 8 which is delimited by the waist formed by the longitudinal grooves, and such channel extends lengthwise along the backing 8, wherein a spring strip 20 is mounted in such channel along the length of the wiper blade rubber 2 in order to achieve a targeted distribution of the contact pressure applied by the claws 7 of the wiper blade carrier 1 onto the wiper blade rubber 2. A washer fluid conduit 21 with a flat oval cross-section, which runs in a lengthwise direction, is formed into the lower section of the backing 8 that is delimited by the waist formed by the longitudinal grooves 18. This washer fluid conduit 21 features a row of fluid openings 22 that open into the opposite longitudinal sides of the backing 8. By making use of the elastic properties of the material of the wiper blade rubber, these fluid openings 22 are designed in such a way that only the front fluid openings 22 relative to the direction of motion B are open and the back fluid openings 22 are closed. In the wiper blade rubber 2 illustrated in FIG. 2, the right-hand fluid openings 22 are open and the left-hand fluid openings 22 are closed. For this reason, the discharge of washer fluid by the right-hand fluid openings 22 is represented by continuous lines and that of the left-hand fluid openings 22 is shown with dotted lines only. In addition to these fluid openings 22, numerous other fluid openings 24 are provided which open into the space between the two wiper lips 9 on the bottom side 12 of the backing 8. Due to these measures, it is possible to further improve the wiping quality that can be achieved.

FIG. 2 shows the wiper blade rubber 2 during a wiping operation. The wiped area lying in front of the wiper blade rubber 2 is wetted with washer fluid or an intensive cleaning agent via the washer fluid conduit 21 and the leading opened fluid openings 22 relative to the direction of motion B. Washer fluid also is applied to the windshield 10 from the additional fluid openings 24 lying between the two wiper lips 9. While the wiper blade rubber 2 is moving in the direction of motion B, the wiper lips 9 are titled by the motion of the flexible necks 11 to a forward position in relation to the direction of motion B. In doing so they can be supported on the bottom side 12 of the backing 8 with the shoulder 13, and the lower sections of the wiper lips 9 are swung slightly against the direction of motion B.

It is evident that the intensive-cleaning element 15 attached to the leading wiper lip 9, i.e., the right-hand wiper lip 9, comes into contact with the windshield 10 and sweeps over it. In doing so, the dirt loosened or softened by the washer fluid is loosened or removed from the windshield 10. The trailing, i.e., the left-hand, wiper lip 9 contacts the windshield 10 with its wiping edge 23 and, using the effect of the washer fluid applied onto the windshield 10 via the fluid openings 24, removes the loosened dirt from the wiped area. When the direction of motion B is reversed, the two wiper lips 9 swing over to the opposite tilted position, so that now the intensive-cleaning element 15 attached to the left-hand wiper lip 9 and the wiping edge 23 of the right-hand wiper lip 9, which previously were not in contact with the windshield 10, come into contact with the windshield 10.

Due to the fact that the intensive-cleaning elements 15 are divided into individual segments 16 that are offset in relation to one another, a complete wiping cycle, consisting of a to-and-fro motion of the wiper blade rubber 2, is necessary for sweeping the entire area wiped by the windshield wiper blade with intensive-cleaning elements 15. In addition to the improved cleaning effect achieved with these intensive-cleaning elements 15 through the greater surface pressure, the segmentation of the intensive-cleaning elements 15 also gives rise to an improved self-cleaning effect. Dirt taken by the intensive-cleaning elements 15 can be washed out more easily when these intensive-cleaning elements 15 are divided into segments 16. This self-cleaning effect is further improved by discharging the washer fluid, always in relation to the direction of motion, in front of the wiper blade rubber 2, the design of which was described above.

What is claimed is:

1. A windshield wiper blade for a vehicle windshield wiper device with a wiper blade rubber made of resiliently deformable material, which has a backing with which it is attached to a wiper blade carrier, wherein a bottom side of the backing facing towards the windshield has two parallel, separate wiper lips, each of which is connected to the backing by a flexible neck; and an intensive-cleaning element is mounted on each of mutually remote longitudinal sides of the wiper lips, so that, during wiping operations, the intensive-cleaning element attached to a leading wiper blade in relation to the direction of motion of the wiper blade rubber and a wiping edge of a trailing wiper lip are in contact with the windshield, characterized in that the intensive-cleaning elements are formed of a plurality of individual segments mutually spaced lengthwise on the wiper blade rubber, wherein the segments of one wiper lip are offset relative to the segments of the other wiper lip in such a way that the segments overlap to a certain degree, and in that a washer fluid conduit runs lengthwise in the backing and has fluid openings for discharging washer fluid onto the windshield.

2. A windshield wiper blade according to claim 1, characterized in that the fluid openings along the longitudinal sides of the backing are designed such that only front ones of the fluid openings in relation to the direction of motion of the wiper blade rubber are open.

3. A windshield wiper blade according to claim 2, characterized in that additional fluid openings for washer fluid open into the space between the two wiper lips on the bottom side of the backing.

4. A windshield wiper blade according to claim 1, characterized in that a main body of the wiper blade rubber is an extruded main body and includes the backing and the two wiper lips connected to the backing, wherein the intensive-cleaning elements are separately attached to the wiper lips.

5. A windshield wiper blade according to claim 3, characterized in that the backing of the wiper blade rubber includes at least one channel with a closed cross-section, in which one spring strip is mounted to achieve a distribution of surface pressure applied by the windshield wiper blade along the entire length of the wiper blade rubber.

6. A windshield wiper blade for a vehicle windshield wiper device with a wiper blade rubber made of resiliently deformable material, which has a backing with which it is attached to a wiper blade carrier, wherein a bottom side of the backing facing towards the windshield has two parallel, separate wiper lips, each of which is connected to the backing by a flexible neck; and an intensive-cleaning element is mounted on each of mutually remote longitudinal sides of the wiper lips, so that, during wiping operations, the intensive-cleaning element attached to a leading wiper blade in relation to the direction of motion of the wiper blade rubber and a wiping edge of a trailing wiper lip are in contact with the windshield, characterized in that the intensive-cleaning elements are formed of a plurality of individual segments mutually spaced lengthwise on the wiper blade rubber, wherein the segments of one wiper lip are offset relative to the segments of the other wiper lip in such a way that the segments overlap to a certain degree.

7. A windshield wiper blade according to claim 6, characterized in that a washer fluid conduit runs in the backing and has fluid openings for discharging washer fluid onto the windshield.

8. A windshield wiper blade according to claim 7, characterized in that the fluid openings are along longitudinal sides of the backing and are designed such that only front ones of the fluid openings in relation to the direction of motion of the wiper blade rubber are open.

9. A windshield wiper blade according to claim 7, characterized in that additional fluid openings for washer fluid open into the space between the two wiper lips on the bottom side of the backing.

10. A windshield wiper blade according to claim 6, characterized in that a main body of the wiper blade rubber is an extruded main body and includes the backing and the two wiper lips connected to the backing, wherein the intensive-cleaning elements are separately attached to the wiper lips.

11. A windshield wiper blade according to claim 6, characterized in that the backing of the wiper blade rubber includes at least one channel with a closed cross-section, in which one spring strip is mounted to achieve a distribution of surface pressure applied by the windshield wiper blade along the entire length of the wiper blade rubber.

* * * * *